Figure 2A:
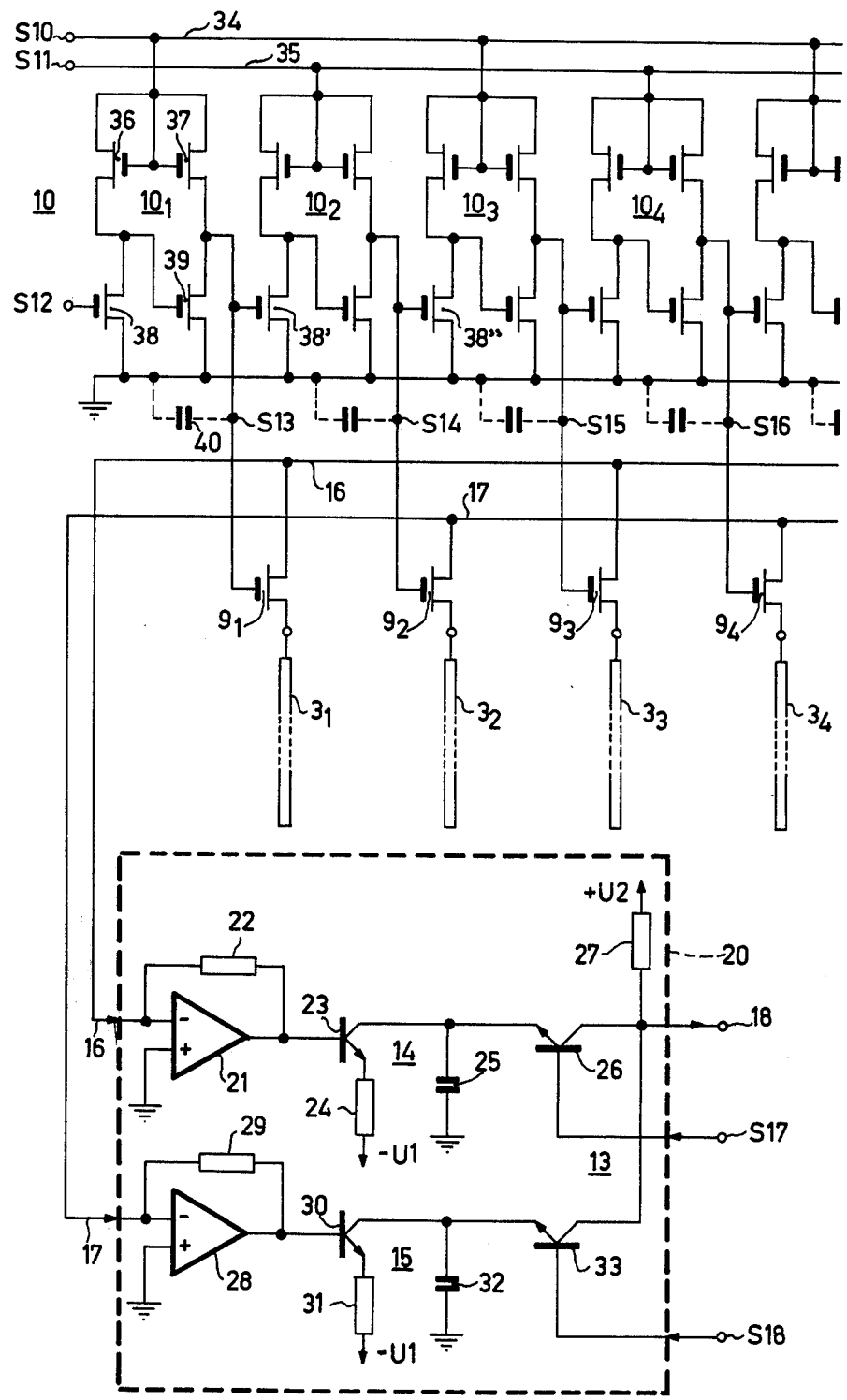

United States Patent [19]

Carasso et al.

[11] 4,117,515

[45] Sep. 26, 1978

[54] TELEVISION CAMERA HAVING SIGNAL ELECTRODE STRIPS

[75] Inventors: Marino Giuseppe Carasso; Leendert Johan van de Polder; Sing Liong Tan, all of Eindhoven, Netherlands

[73] Assignee: U.S. Philips Corporation, New York, N.Y.

[21] Appl. No.: 769,034

[22] Filed: Feb. 16, 1977

[30] Foreign Application Priority Data

Dec. 24, 1976 [NL] Netherlands ........................ 7614384

[51] Int. Cl.² .......................... H04N 5/30; H04N 9/07
[52] U.S. Cl. ..................................... 358/217; 358/48
[58] Field of Search ........................... 358/44, 48, 217; 313/384, 390

[56] References Cited

U.S. PATENT DOCUMENTS 3,248,477  4/1966  Kaplan ..................................... 358/48

4,059,840  11/1977  van de Polder et al. ............... 358/48

Primary Examiner—John C. Martin
Attorney, Agent, or Firm—Frank R. Trifari; Henry I. Steckler

[57] ABSTRACT

A black-white or color television camera comprising a pick-up tube, provided with a signal electrode composed of separated strips. Prior to a line scan to be performed by an electron beam, the signal electrode strips are connected to a reference potential. After a scan the strips are through-connected successively through associated switches for supplying information. The switch outputs are alternatingly, in at least two groups through-connected and connected to at least two output leads. Always two stitches, which are connected to two adjacent stiips are closed simultaneously. In this way it is avoided that a capacitive voltage distribution across the strips and switch inputs influence the picture signal obtained in a disturbing manner.

13 Claims, 10 Drawing Figures

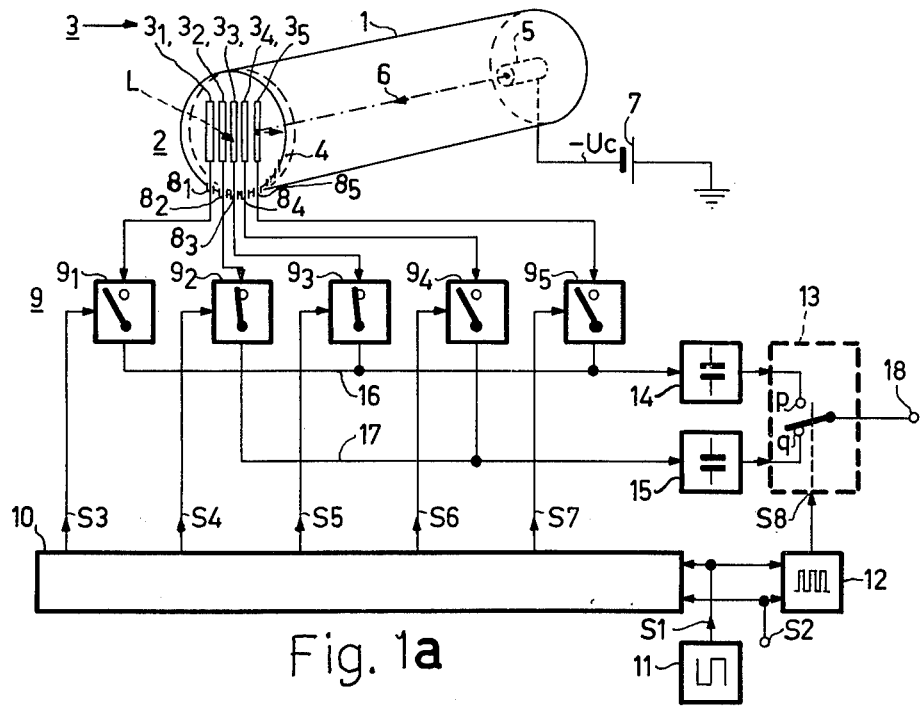
Fig. 1a
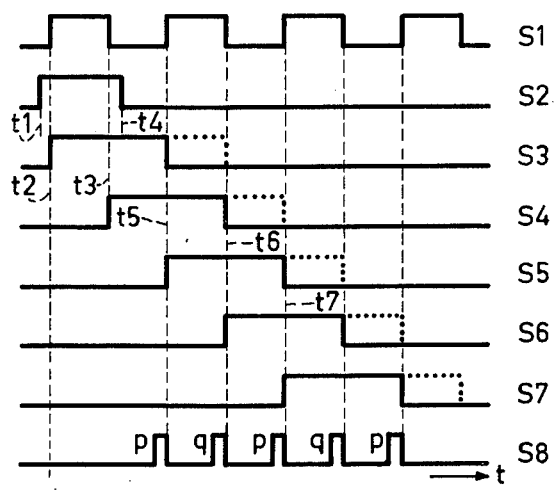
Fig. 1b
Fig. 1c
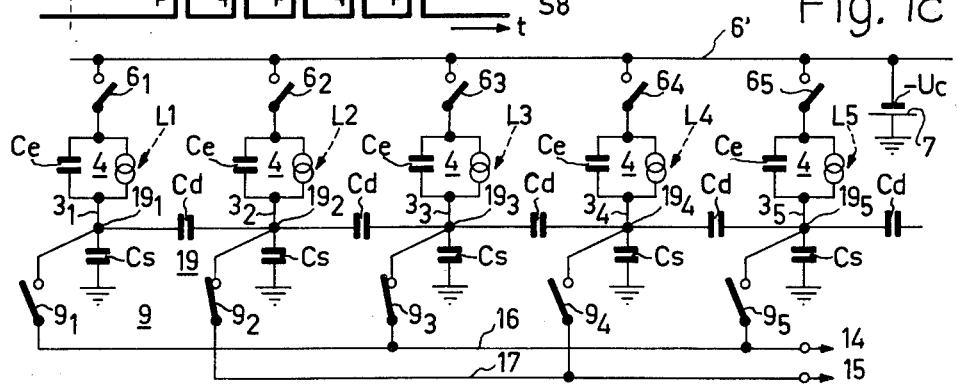

TELEVISION CAMERA HAVING SIGNAL ELECTRODE STRIPS

Television camera and pick-up tube suitable therefore.

The invention relates to a television camera comprising a pick-up tube which is provided with an electron gun for generating an electron beam, with deflection means for deflecting the electron beam and with a target plate composed of a photo-sensitive layer to be scanned by the electron beam and a signal electrode which is applied in the form of electrically conducting strips which are separated from each other, whilst a line scanning is effected across successive strips and the strips of the signal electrode are separately coupled to associated parallel inputs of at least a switching circuit provided with switches connected to the parallel inputs and with a switching signal generator for controlling the switches, so that prior to a line scan of the target plate by the electron beam the signal electrode strips have been connected to a reference potential through the switching circuit and that after a local scan has been effected by the electron beam at a signal electrode strip, the switch which is connected to the associated parallel input is closed for passing on information, and to a pick-up tube suitable therefore; all this in accordance with the U.S. Pat. No. 4,059,840.

Said patent describes a television camera and a pick-up tube wherein a separation is obtained between the the electron beam scan and the picture signal supply by the pick-up tube which has the advantage that the beam scan does no longer affect the picture quality in the direction of line scan. In addition an improved signal-to-noise ratio is obtained.

In the camera the pick-up tube is used in combination with the switching circuit integrated in a semiconductor body which circuit may, for example, have been included in the pick-up tube itself.

The camera has the advantages which are offered by the use of the pick-up tube as well as by the use of integrated circuits, while one use offsets the disadvantages of the other.

The construction of the pick-up tube with a large plurality of signal electrode strips, for example, 500 and more, which are each connected to a switch input may result in that the shunt capacitance of (especially) the switch input and the strip connected thereto to the adjacent and the remote switch inputs and strips becomes so great that with a sequential passing-on of information no correct passing on of information via the switch occurs. Namely, the shunt capacitances give a capacitive voltage distribution across the switch inputs so that when the switches are sequentially closed for passing on information a picture signal is ultimately supplied with capacitive cross-talk. The sequential closure of the switches occurs with some time delay relative to the electron beam scan. Closing occurs, for example, when after the electron beam has passed it has thereafter moved away for 20 to 30 signal electrode strips.

To eliminate the capacitive cross-talk a television camera according to the invention has an improvement which consists in that the outputs of the switches whose inputs are connected to successive, separated signal electrode strips have alternatingly been through-connected in groups and in the presence of at least two groups are connected to at least two output leads, wherein with a sequentially occurring passing-on of information always at least two switches which are connected to two adjacent signal electrode strips and which have been connected to different output leads, are closed simultaneously.

The above manner of passing on information prevents that the capacitive voltage distribution results in the retention of a residual charge after switching of the switches as happens when the switches are successively switched without overlap in time. Owing to the simultaneous closure of at least two switches of adjacent signal electrode strips, which switches are connected to different output leads, the residual charge is removed and the proper supply of information is obtained.

A simple passing-on of the information from the output lead occurs in a television camera which is characterized in that the output lead is connected to a picture signal output through an integrating circuit which is provided with a periodically operating resetting stage.

A possibly desired coupling of two output leads to one and the same picture signal output is achieved in a simple manner in a television camera which is characterized in that in the presence of only two output leads the resetting stages coupled thereto and which are alternatingly operative, are connected to the same picture signal output.

A television camera provided with two output leads and made suitable for colour television is characterized in that in the presence of several picture signal outputs each is connected through an alternatingly operating resetting stage to each of the integrating circuits which are coupled to the two output leads.

To enable the application of a resetting stage with a double function, namely the resetting of the integrating circuit and a through-connection of the information a television camera is characterized in that the resetting stage comprises an input for connection to a second switching signal generator which, synchronized with the above-mentioned first switching signal generator, is constructed for supplying switching pulses with a reference voltage.

With a simple construction of a resetting stage a television camera in accordance with the invention is characterized in that the resetting stage is provided with a transistor whose emitter is connected to a terminal of a signal integrating capacitor in the integrating circuit, whilst the collector is coupled to a power supply terminal through a resistor and the base is connected to the second switching signal generator for supplying switching pulses with a reference voltage.

The supply through the output lead and the switches of a reference potential to the signal electrode strips while information is simultaneously supplied occurs in a television camera which is characterized in that the output lead is connected to the integrating circuit through an amplifier, which amplifier comprises a difference amplifier whose non-inverting input is connected to the reference potential and whose inverting input, which is coupled through a resistor to the output, is connected to the output lead.

A television camera suitable for colour television wherein the signal electrode strips are combined with colour filters is characterized in that the outputs of the switches are alternatingly through-connected in three groups which are connected to three output leads.

A residual charge removal which goes still further is obtained, if desired, in a television camera which is characterized in that always three switches which are connected to three adjacent signal electrode strips are closed simultaneously.

A television pick-up tube suitable for use in a television camera where no disturbing influence is found of the capacitive voltage distribution on the picture signal generation performed by the sequentially occurring passing-on of information is characterized in that in the pick-up tube the signal electrode stips are connected separated from one another to switches the other side of which is alternatingly through-connected in groups and in the presence of at least two groups are connected to at least two output leads which each have an electrically conducting wall feed-through through the tube envelope.

A television pick-up tube having a favourable space utilization is characterized in that in the pick-up tube the two output leads are disposed on either side of the ends of the signal electrode strips.

Figure 2B:
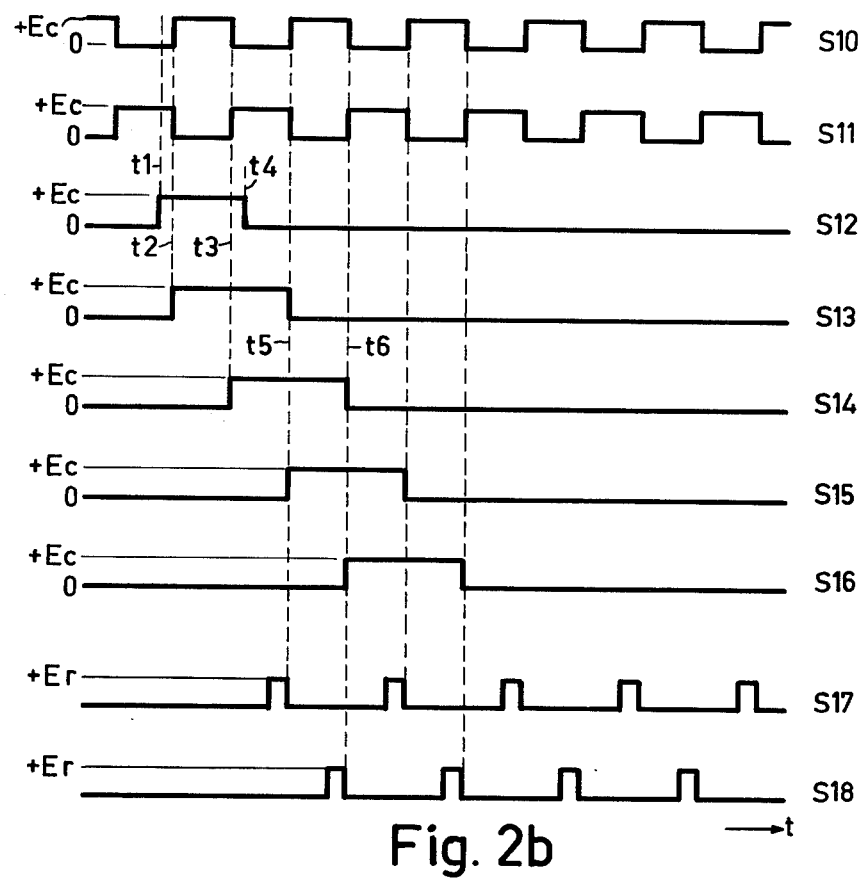
Figure 3B:
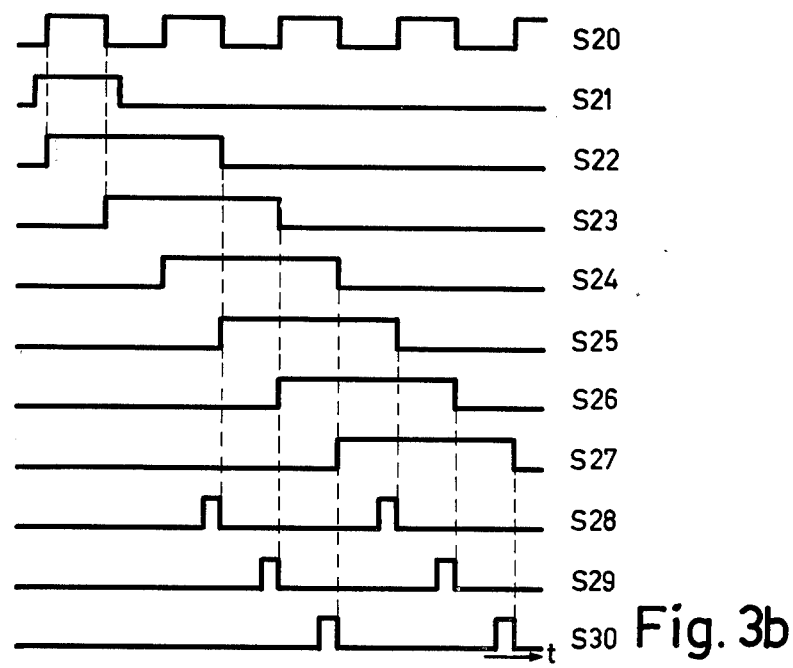
Figure 3A:
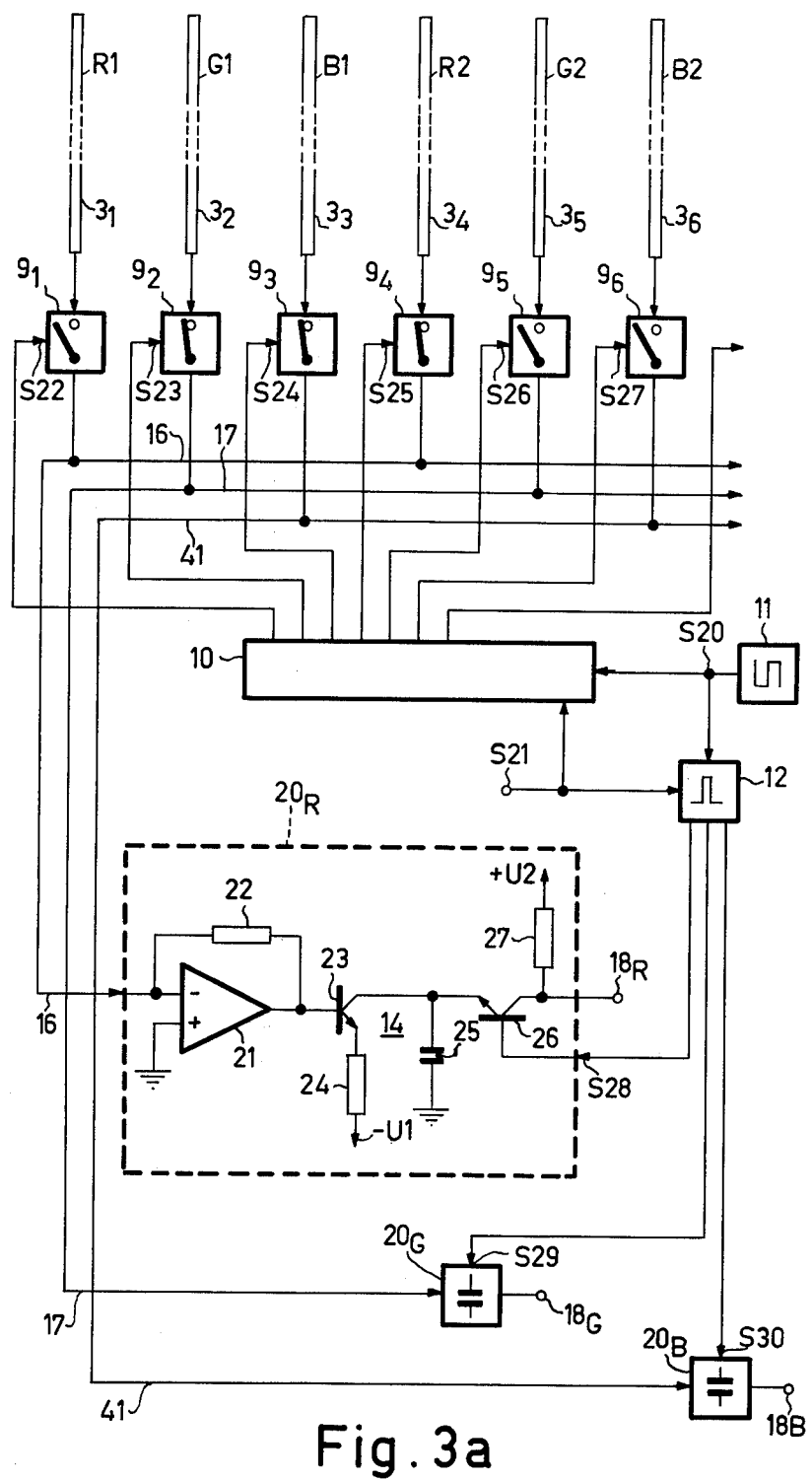
Figure 4A:
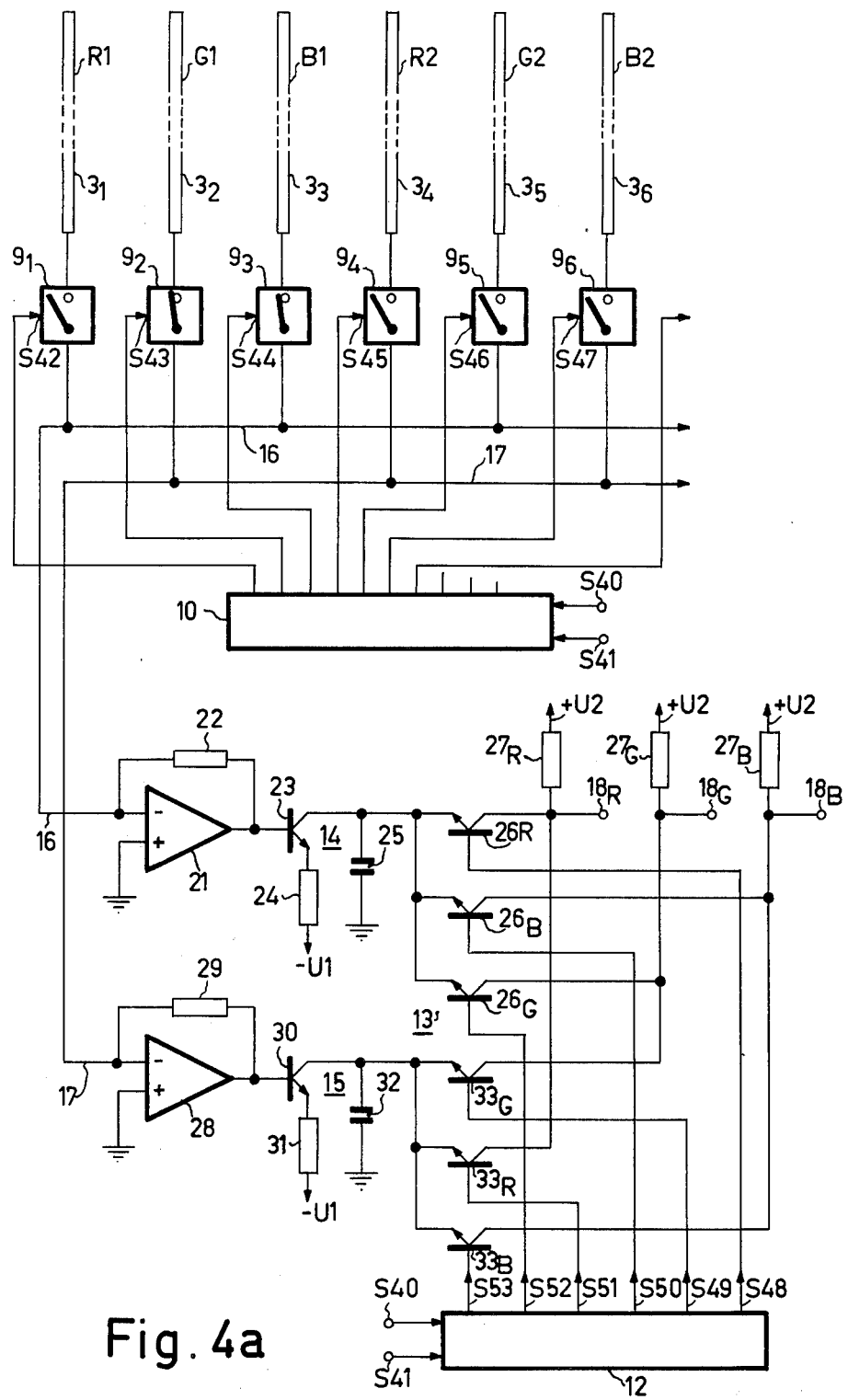
Figure 4B:
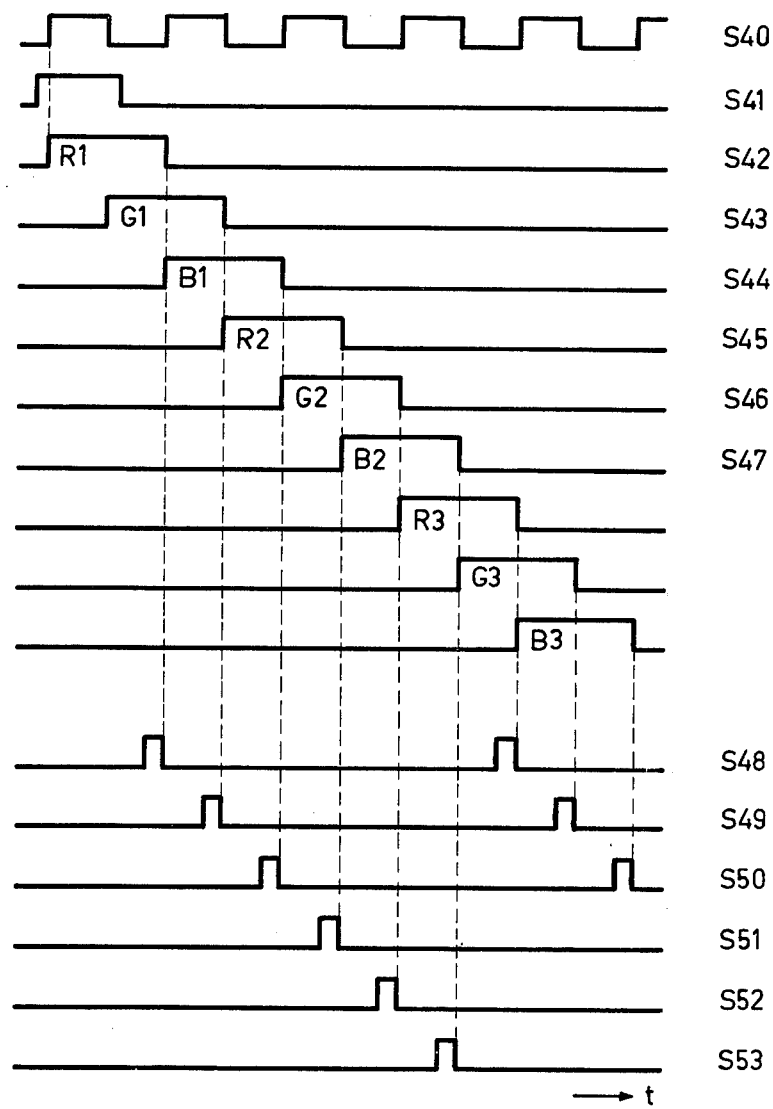
Figure 5:
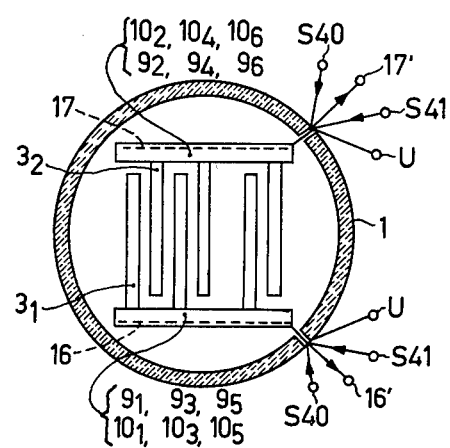

The invention will be further explained with reference to the following Figures which are given by way of example, in which FIG. 1a in FIG. 1 shows diagrammatically a television camera according to the invention, FIG. 1b some signals as a function of the time and FIG. 1c partly an equivalent circuit diagram of the camera, FIG. 2a shows a more detailed construction of a television camera and FIG. 2b some signals as a function of the time, FIG. 3a shows an embodiment of a camera for colour television and FIG. 3b some signals as a function of the time, FIG. 4a shows a second embodiment of a camera for colour television and FIG. 4b some signals as a function of the time, and FIG. 5 is an elevational view of a television pick-up tube according to the invention.

In a television camera as shown in FIG. 1a reference 1 indicates a pick-up tube which is diagrammatically shown with only those components which are of importance for understanding the present invention. Reference 2 indicates a target plate which is assembled from a signal electrode 3 consisting of transparent, electrically conducting strips $3_1$, $3_2$, $3_3$, $3_4$, $3_5$. . . and from a semiconductor layer 4. FIG. 1a shows only five strips of the signal electrode but in practice there will be, for example, 500 or more. Furthermore, L indicates light originating from a scene which light is projected onto the semiconductor layer 4 through the signal electrode 3.

In the pick-up tube 1 an electron gun 5 produces an electron beam 6 which, in a manner customary for television scans the target plate 2 line by line and field by field under the influence of deflection means, not shown. An arrow at the target plate 2 indicates the direction of line scan which is transverse to the direction in which the signal electrode strips $3_1$, $3_2$ . . . are located. The cathode, not shown, of the electron gun 5 is connected to a terminal of a voltage source 7, which terminal carries a negative voltage $-Uc$, another terminal of this voltage source being connected to ground. The signal electrode strips $3_1$, $3_2$, . . . $3_5$ each have, for example, through the tube envelope an electrically conducting wall feed-through $8_1$, $8_2$ . . . $8_5$ which are connected to signal inputs of switches $9_1$, $9_2$ . . . $9_5$. The switches 9 are provided with switching inputs which are connected to outputs of a switching signal generator 10. For its control the generator 10 is connected to an output of a clock pulse source 11 which output carries a clock pulse signal S1 and which is furthermore connected to an input of a second switching signal generator 12. In addition, an input of the generators 10 and 12 are each connected to a terminal to which a starting signal S2 is supplied. In FIG. 1b signals S1, S2 to S8 inclusive are plotted as a function of the time $t$. Under the control of the clock pulse signal S1 and the starting signal S2 the generator 10 generates the switching signals S3 to S7 inclusive for supply to the switches $9_1$ to $9_5$ inclusive whilst the generator 12 generates the switching signal S8 for supply to a commutator 13. The commutator 13 has two selector contacts $p$ and $q$ which are connected to an output of a signal integrating circuit 14 and 15 respectively. The input of the circuit 14 is connected to the outputs of the switches $9_1$, $9_3$ and $9_5$ through an output lead 16. The input of the circuit 15 is connected to the outputs of the switches $9_2$ and $9_4$ through an output lead 17. The commutator 13 is connected at its output to a picture signal output 18 of the television camera shown in FIG. 1a. The camera shown in FIG. 1a is provided in the manner described with a switching circuit (9 to 17 inclusive).

The above-mentioned patent describes the camera shown in FIG. 1a from the pick-up tube 1 to the switches 9 inclusive. Different hereof is that the switches 9 are controlled in an essentially different manner from the switching signal generator 10; at all times two switches 9 are closed simultaneously, not counting a starting and stopping phenomenon at the beginning and end of the passing on of information of a line. In FIG. 1a the switches $9_2$ and $9_3$ are drawn as being closed with and with which an instant located between two instants t5 and t6 given in FIG. 1b is associated. The switching signals S4 and S5 then both have a switching pulse which corresponds with the closed state of the switches $9_2$ and $9_3$. In FIG. 1b the starting signal S2 is given with a starting pulse from an instant t1 to an instant t4. At an instant t2 a clock pulse edge is produced in the signal S1 at which the switch $9_1$ closes under the control of the switching pulse in the signal S3 which is supplied by the generator 10. The clock pulse edge at an instant t3 gives the switching pulse in the signal S4 for closing the switch $9_2$. From the instant t3 two of the switches 9 are invariably closed alternately until ultimately the last but one of the switches 9 opens. Synchronous with switching of the switches 9 the switch-over from the commutator 13 takes place under the control of the signal S8 which is shown in FIG. 1b with switch-over pulses $p$ and $q$ which correspond with the through-connected state of the selector contacts $p$ and $q$ of the switch 13. In the absence of a through-connection of the selector switches $p$ and $q$ the output 18, is for example, conneted to ground.

To explain the operation of the camera shown in FIG. 1a with the switching circuit (9 to 17 inclusive) FIG. 1c shows partly an equivalent circuit diagram of the camera and corresponding components are, just as in the following Figures, given the same reference numerals or reference numerals provided with accents. In FIG. 1c the electron beam 6 of FIG. 1a is shown as a lead 6' having a plurality of switches $6_1$ to $6_5$ inclusive. Pick-up elements composed of capacitances Ce and photo-sensitive current sources L1 to L5 inclusive, which are present in parallel are drawn at the signal electrode strips $3_1$ to $3_5$ inclusive. Depending on the material of the semiconductor layer 4 a photo-sensitive resistor might likewise be drawn instead of the current source. For a semiconductor layer 4 of lead oxide the current source indication is more representative and for an antimony tri-sulphide layer a resistor representation is more feasible. The capacitance Ce of the pick-up element represents the capacitance of the semiconductor layer 4 between the signal electrode strip and the free surface of the layer 4 having as area the width of the strip and in the longitudinal direction thereof the diameter of the scanning electron beam 6.

Capacitances Cs indicate the capacitances relative to ground of the signal electrode strips $3_1, 3_2 \ldots$ and the inputs of the switches $9_1, 9_2 \ldots$, the switch inputs furnishing the largest contribution. Capacitances Cd indicate the shunt capacitances which are found between a signal electrode strip and a switch input and the other strips and switch inputs. For illustration and by way of example the following values are given:

Ce = 0.01 pf, Cs = 0.1 pF and Cd = 1 pF if some 500 to 600 strips $3_1, 3_2 \ldots$ are present. The nodes of the capacitances Ce, Cd and Cs and the switches $9_1, 9_2$ are indicated by $19_1$ to $19_5$ inclusive.

In FIG. 1c the switches $9_2$ and $9_3$ are shown as being closed while the other switches 9 and the switches $6_1, 6_2 \ldots$ are opened. As indicated at FIG. 1b an instant is associated herewith which is located between the instants t5 and t6. For the electron beam scan represented by the switches $6_1, 6_2 \ldots$ it is assumed that this has taken place prior to the instant t1. A television field period earlier, owing to the preceding electron beam scan and therewith the closing of the circuit with the voltage source 7, the switches $6_1, 6_2 \ldots$ and the capacitances Ce and Cs, substantially the entire voltage −Uc is applied across the capacitances Ce. In the subsequent field period the photo-sensitive discharge of the capacitances Ce takes place through the current sources L1, L2 . . . , the voltages at the nodes 19 of the capacitances Cs, Cd and Ce remaining unchanged. The electron beam scan prior to the instant t1 results in that the loss of charge in the capacitance Ce is on theone hand replenished by the electron beam (the voltage −Uc is locally impressed on the free surface of the semiconductor layer 4) and on the other hand that the loss of charge is found as a negative charge on the nodes 19 of the capacitances Cs, Cd and Ce.

If the shunt capacitances Cd are negligible small relative to the capacitances Cs the passing on of information from the nodes 19 to the switches 9 can be done when successively one of the switches $9_1, 9_2 \ldots$ is closed. A current circuit is closed then in which the capacitance Cs is included and the negative charge which is present as information at the node 19 is discharged and measured. The presence of the non-negligibly small shunt capacitances Cd results in that when always one switch $9_1, 9_2 \ldots$ is successively closed no correct passing on of the information occurs. Namely, the shunt capacitances Cd result in a capacitive voltage distribution across the nodes 19 so that at a sequential passing on of information an output signal with cross-talk is obtained; residual charges remain at the nodes 19 depending on the charges at the nodes 19 still to be through connected.

The effect of the, in accordance with the invention, sequential closing of the switches $9_1, 9_2 \ldots$, wherein at all times at least two switches $(9_2, 9_3)$ of adjacent signal electrode strips $(3_2, 3_3)$ are closed, not considering that at the beginning and at the end only the first $(9_1)$ and respectively the last switch is closed, is illustrated by the following table.

TABLE

| instants | switches closed | nodes | | | | | output leads | output |
|---|---|---|---|---|---|---|---|---|
| | | $19_1$ −Q1 | $19_2$ −Q2 | $19_3$ −Q3 | $19_4$ −Q4 | $19_5$ −Q5 | 16, 14 17, 15 | 18 |
| t2 | $9_1$ | +q1 | −Q2 | −Q3 | −Q4 | −Q5 | −Q1−q1 | |
| t3 | $9_1, 9_2$ | 0 | +q2 | −Q3 | −Q4 | −Q5 | +q1 −Q2−q2 | −Q1 |
| t5 | $9_2, 9_3$ | 0 | 0 | +q3 | −Q4 | −Q5 | −Q3−q3 +q2 | −Q2 |
| t6 | $9_3, 9_4$ | 0 | 0 | 0 | +q4 | −Q5 | +q3 −Q4−q4 | −Q3 |
| t7 | $9_4, 9_5$ | 0 | 0 | 0 | 0 | +q5 | −Q5−q5 +q4 | −Q4 |

In the table which belongs to FIG. 1c −Q1,−Q2,.... indicate the negative charges or the charge informations such as they are found at the nodes $19_1, 19_2, \ldots$ Ultimately, after processing of the signals the charge informations −Q1,−Q2 are successively found at the picture signal output 18 of FIG. 1a, just prior to the instants t5, t6, t7 etc., as indicated in greater detail in the table. By +q1, +q2 . . . the residual charges are indicated which owing to the fact that two adjacent switches 9 are simultaneously closed make their contribution in the picture signal. For example, at the instant t5 the switch $9_3$ closes and the charge information −Q3−q3 at the output lead 16 is passed on. Simultaneously the residual charge +q2 which is still present in the shunt capacitance Cd between the nodes $19_2$ and $19_3$ becomes available for the output lead 17. Closing of the switch $9_4$ at the instant t6 results in that the residual charge +q3 present in the shunt capacitance Cd between the nodes $19_3$ and $19_4$ becomes available at the output lead 16 through the switch $9_3$. The charge informations −Q3−q3 and +q3 are added together in the integrating circuit 14 and just prior to the instant t7 the output of the integrating circuit 14 which is connected to the selector contact p is connected through the commutator 13 to the output 18 on which therefore the charge information −Q3 becomes available. The integrating circuit 14 is reset to a reference voltage relative to which the charge information derived from the signal electrode strip $3_5$ is processed thereafter.

It appears from the table that owing to the fact that at all times two of the switches 9 are closed the use of the two output lead 16 and 17 and the integrating circuits 14 and 15 connected thereto no residual charges remain but that residual charges q contribute in the picture signal at the output 18. Closing of successively only one of the switches 9 would result in unwanted charge information (to be compared with the information −Q−q) is obtained instead of the proper charge information −Q.

If desired it is possible to close three or more of the switches 9 simultaneously. FIG. 1b shows for illustration the switching pulses in the signals S3 and S7 inclusive extended by the dotted portion; the changeover signal S8 being unchanged. The result is that charge which could not be removed in one clock pulse period owing to a great time constant is added, by leaving the relevant switch 9 switched-on to the charge derived from the signal electrode strip which is located two strips further. Against this advantage of a total removal of residual charge there is the cros-talk introduced therewith and the greater capacitive loading of the output leads 16 and 17.

FIG. 2a shows a detailed construction of the switching signal generator 10 and an output circuit 20 which includes the integrating circuits 14 and 15 and commutator 13. FIG. 2b shows as a function of the time t signals S10 to S18 inclusive which are produced in the circuit according to FIG. 2a. In FIG. 2a the output lead 16 is connected to an inverting input of a difference amplifier 21 which is connected to the output through a resistor 22. The non-inverting input of the amplifier 21 is connected to ground. The output of the amplifier 21 is connected to the base of an npn-transistor 23 whose emitter is connected through a resistor 24 to a terminal having a supply voltage −U1. The collector of the transistor 23 is connected via a signal integrating capacitor 25 to ground and is furthermore connected to the emitter of an npn-transistor 26. The collector of the transistor 26 is connected through a resistor 27 to a terminal having a supply voltage +U2. The base of the transistor 26 is connected to an input of the output circuit 20 to which the signal S17 shown in FIG. 2b is supplied. The output lead 17 is connected in a corresponding manner to an amplifier 28, a feedback resistor 29, a transistor 30, a power supply resistor 31, an integrating capacitor 32 and a transistor 33 to whose base the signal S18 is supplied and whose collector is connected to the resistor 27. The circuit 20 comprises the integrating circuit 14 which includes the components 23 to 27 inclusive, the transistor 26 and resistor 27 constituting a periodically active resetting stage (26, 27). In like manner the integrating circuit 15 comprises the components 27, 30 to 33 inclusive, the transistor 33 and the resistor 27 constituting a periodically active resetting stage (33, 27). The transistors 23 and 30 are used for obtaining a low output impedance and, depending on the construction of the amplifier 21, may have been included herein. It is only of importance that the collector current of the transistors 23 and 30 respectively is proportional to the output voltage of the amplifiers 21 and 28 respectively, which voltage is impressed on the base.

By alternatingly switching the resetting stages (26, 27) and (33, 27) through the signals S17 and S18 shown in FIG. 2b these two resetting stages together operate as the commutator 13. The passing on of information from the capacitors 25 and 32 is herein coupled with a resetting to a reference voltage +Er which is indicated in FIG. 2b at the signals S17 and S18. The negative (−Q−q) and the positive charge information (+q) on the output lead 16 (or 17) give a positive and negative voltage respectively on the amplifier output and the base of the transistor 23 which consequently starts conducting more and less current respectively from the capacitor 25 relative to a setting current. At the end of the integration period (a clockpulse period) a pulse having the reference voltage +Er in the signal S17 is impressed on the base of the transistor 26 which causes a current to flow through the resistor 27 to the capacitor 25 until the voltage +Er is found across this capacitor. The voltage on the emitter of the transistor 26 cannot increase further than to the voltage which is impressed on the base.

The amplifier 28, the transistor 30, the capacitor 32 and the transistor 33 operate in the same manner. It appears from FIG. 2b that the switching pulses in the switching signal S18 are produced shifted by half a clockpulse period relative to those in the swiching signal S17, whilst in both switching signals, the switching pulses with the clockpulse period occur.

The virtual ground on the inverting input of the amplifiers 21 and 28 gives that after processing the charges on the outputs leads 16 and 17, these leads carry substantially the ground potential which is supplied through the switches $9_1, 9_2, \ldots$ when they are closed, as a reference potential to the signal electrode strips $3_1, 3_2, \ldots$ FIG. 2a shows an embodiment of the switching signal generator 10 which is suitable for integration in a semiconductor body. In addition, the switches $9_1, 9_2 \ldots$ which are shown in FIG. 2a as transistors having an insulated gate electrode may have been integrated in the same semiconductor body. The transistor-switches $9_1, 9_2 \ldots$ must be able to conduct current into two directions for the required passing-on of the negative main charges $(-Q-q)$ and the positive residual charges $(+q)$ derived from the signal electrode strips $3_1, 3_2 \ldots$ The switching signal generator 10 of FIG. 2a is composed of identical stages $10_1, 10_2, 10_3$ and $10_4$, for each generating of the switching signals S13, S14, S15 and S16 which are shown in FIG. 2b. S10 and S11 indicate two inverse clocksignals which are supplied to two clock signal leads 34 and 35. Lead 34 is connected to the first stage $10_1$ of the generator 10 wherein, the same as in the subsequent stages $10_2, 10_3, 10_4 \ldots$ four transistors 36 to 39 inclusive having insulated gate electrodes are included. The transistors 36 and 37 have interconnected gate and drain electrodes which are connected to the clock signal lead 34 and which operate as switchable resistors. The source of the transistor 36 is connected to the drain and the gate electrode respectively of the transistor 38 and 39 respectively. The source of the transistor 37 is connected to the drain of the transistor 39 whose source is connected to ground. The source of the transistor 38 is connected to ground and the gate electrode is connected to an input of the generator 10 for supplying the starting signal S12. The node of the transistors 37 and 39 is connected to the gate electrode of the transistor switch $9_1$ and 40 indicates a (parasitic) capacitance to ground which is positively utilized when the generator 10 is in operation. The node of the transistors 37 and 39 is furthermore connected to the second stage $10_2$ of the generator 10 and is connected therein to the gate electrode of a transistor 38'.

To explain the operation of the switching signal generator 10 of FIG. 2a the following applies. Prior to the instant t1 given in FIG. 2b at which the starting pulse is produced in the starting signal S12 the clock-signals S10 and S11 are present on the leads 34 and 35. In the signals S13, S14, ... substantially the ground potential (OV) is invariably present. This follows for the first stage $10_1$ with the signal S13 as the positive clock pulses having voltage +Ec in the signal S10 render the transistor 39 conductive so that substantially the ground potential occurs at the node of the transistors 37 and 39 while in the presence of the ground potential in the signal S10 it is supplied to said node through the transistor 37. In this situation the transistor 38 is blocked. For the second stage $10_2$ it applies that the ground potential on the node of the transistors 37 and 39 renders the transistor 38' non-conducting so that the given description of the clock signal S10 for the stage $10_1$ also applies to the clock signal S11 for the stage $10_2$. It follows that for the instant t1 the ground potential is found in all switching signals S13, S14, ...

From the instant t1 the starting pulse with, for example, the voltage +Ec or a higher voltage is produced in the signal S12 which causes the transistor 38 to be biassed for conduction. The positive clock pulse having a voltage +Ec in the signal S10 in the instant t2 gives that the transistor 38 is rendered conducting and that the ground potential is impressed on the gate electrode of the transistor 39 which is consequently rendered non-conducting. The positive clock pulse in the signal S10 gives through the transistor 37 the clock pulse voltage +Ec on the signal S13, and, consequently, across the capacitance 40. This renders the switching transistor $9_1$ conducting and the transistor 38' is biassed for conduction. At the instant t3 the ground potential is produced in the signal S10 and the signal S11 is supplied with the positive clock pulse. The transistor 39 remains non-conducting while the transistor 37 is rendered non-conducting so that the capacitance 40 retains the clockpulse voltage +Ec. In addition, at the instant t3 the biassed transistor 38' becomes conducting which causes, as described for the stage $10_1$ at the instant $t_2$, the clock pulse voltage +Ec to be produced in the signal S13 and the transistor switch $9_2$ to be rendered conducting.

From the instant t3 to t5 the positive clock pulse voltage +Ec is present in the two signals S13 and S14 so that both transistor switches $9_1$ and $9_2$ can conduct current. At the instant t5 the positive clock pulse is produced in the signal S10 which causes the transistor 39 to become conducting as at the prior instant t4 the starting pulse in the signal S12 on the gate electrode of the transistor 38 has finished. The capacitance 40 discharges through the transistor 39 to substantially the ground potential. In addition, from the instant t3 the biassed transistor 38" in the stage $10_3$ is now rendered conducting at the instant t5 so that in the signal S15 the clock pulse voltage +Ec is produced.

At the instant t6 the ground potential in the signal S13 and consequently on the gate electrode of the transistor 38' results in that at the instant t5 the ground potential is produced in the signal S14 in the manner described for the signal S13.

FIG. 3a gives a diagrammatic construction of a camera for colour television, FIG. 3b showing some signals S20 to S30 present in the camera as a function of the time t. The signal electrode strips $3_1$, $3_2$... are combined with colour filter strips which are disposed in, for example, the sequence red R, green G and blue B. In FIG. 3a R1, G1, B1 and R2, G2, B2 indicate two triplets.

The outputs of the switches $9_1$, $9_2$... are alternatingly interconnected in three groups which are each connected to its own output lead 16, 17 and 41. Under the control of the clock pulse signal S20 and the starting signal S21 the switching signal generator 10 of FIG. 3a supplies the switching signals S22 to S27 inclusive given in FIG. 3b to the switches $9_1$ to $9_6$ inclusive with a switching pulse duration equal to one and a half times the clock pulse period. In this situation three switches 9 are always closed simultaneously as shown in FIG. 3a for the switches $9_2$, $9_3$ and $9_4$.

In FIG. 3a the output lead 16 is connected to an output circuit $20_R$ which is provided with the components 21 to 27 inclusive already described for FIG. 2a. The circuit $20_R$ is provided with an input connected to the base of the transistor 26 for supplying the switching signal S28 derived from the signal generator 12. In like manner the output lead 17 and 41 respectively is connected to an output circuit $20_G$ and $20_B$ respectively to which furthermore the signal S29 and S30 respectively, which is derived from the signal generator 12 is supplied. The output circuits 20R, $20_g$ and $20_B$ have the outputs $18_R$, $18_G$, and $18_B$ respectively on which the red, green and blue picture signal are found.

With the colour television camera shown in FIG. 3a the RGB-triplets of colour filters are shown by way of example. Other combinations are possible and also quartets of unchanged (Y), red (R), unchanged (Y), blue (B) light-transmissive filter strips leading to an YRYB camera may be used.

FIG. 4a shows an embodiment of a camera for colour television in which it will do to use two output leads 16 and 17, while triplets of colour filter strips R1, G1, B1; R2, G2, B2 etc. are used at the signal electrode strips $3_1$, $3_2$... FIG. 4b gives signals S40 to S53 respectively which occur in the camera of FIG. 4a. Under the control of the clock signal S40 and the starting signal S41 the signal generators 10 and 12 generate respectively the signals S42 to S47 inclusive and S48 to S53 inclusive, shown in FIG. 4b, for supply to the switches $9_1$ to $9_6$ inclusive and to transistors $26_R$, $33_G$, $26_B$, $33_R$, $26_G$, and $33_B$ respectively. The camera shown in FIG. 4a has three outputs $18_R$, $18_G$ and $18_B$ with a red, green and blue picture signal respectively. Through the transistor $26_R$ having the signal S48 on its base the output $18_R$ is periodically coupled to the capacitor 25 in the integrating circuit 14 and the output lead 16. Through the transistor $33_R$ having the signal S51 on its base the output $18_R$ is periodically coupled to the capacitor 32 in the integrating circuit 15 and the output lead 17. In like manner the outputs $18_G$ and $18_B$ are periodically connected through. In the camera shown in FIG. 4a a commutator 13' is consequently operative with six selector contacts which are through-connected through the resetting stages (26, 27) and (33, 27).

FIG. 5 shows diagrammatically an elevational view of a television pick-up tube 1. References $3_1$, $3_2$ indicate signal electrode strips whose other ends are alternatingly coupled through the switches $9_1$, $9_3$, $9_5$... and $9_2$, $9_4$, $9_6$ respectively to the output lead 16 and 17 respectively. The leads 16 and 17 each have an electrically conducting wall feedthrough 16' and 17' through the tube envelope. Furthermore, in the pick-up tube 1 stages $10_1$, $10_3$, $10_5$... and $10_2$, $10_4$, $10_6$... which are described for FIG. 2a may be provided in integrated form. It is then only necessary to make further wall feedthroughs for the clock signal S40 (FIG, 4b), the starting signal S41 and power supply(ies) U. It is evident that through-connections in the pick-up tube can ensure that the clock signal S40, the starting signal S41 and the power supply U each have only one wall feedthrough. The output circuit 20 of FIG, 2a may also have been included in the pickup tube 1 so that not the two output leads 16 and 17 but the single picture signal output 18 has a wall feedthrough. As compared with the pick-up tube 1 shown in FIG. 1a with a great number of wall feedthroughs $8_1$, $8_2$... the construction of FIG. 5 has the advantage that it has a much lower number of wall feed throughs. In addition, the application of two output leads 16 and 17 on both sides of the ends of the signal electrode strips $3_1$, $3_2$... results in a favourable space utilization.

What is claimed is:

1. A television camera comprising a pick up tube having an electron gun means for generating a scanning electron beam, a target plate including a photosensitive layer to be scanned by said beam and a signal electrode having a plurality of separate electrically conducting strips, and means for deflecting said beam for effecting line scanning transversely across successive ones of said strips; a switching circuit including a plurality of switches having inputs coupled to said strips respectively, control inputs, and outputs, successive outputs being alternately coupled in at least two groups to at least two output leads; and a first switching signal generator means coupled to said control inputs for providing that prior to a line scan said strips are coupled to a reference potential through said switching circuit and that after a scan of a strip by said beam the respective switch and at least one switch coupled to an adjacent strip and a different output lead are simultaneously closed to pass information to the respective switch outputs.

2. A television camera as claimed in claim 1, further comprising a plurality of integrating circuits coupled to said output leads respectively and each having a periodically operating resetting stage coupled to respectively picture signal outputs.

3. A television camera as claimed in claim 2, wherein said output leads are two in number, the resetting stages being alternatingly operative and coupled to the same picture signal output.

4. A television camera as claimed in claim 2, wherein said output leads are two in number, said picture signal outputs each being coupled through a respective alternatingly operating resetting stage to each of the integrating circuits which are coupled to the two output leads.

5. A television camera as claimed in claim 2, wherein each resetting stage comprises an input, and further comprising a second switching signal generator means synchronized with the first switching signal generator for supplying switching pulses with a reference voltage to said resetting stage inputs.

6. A television camera as claimed in claim 5, wherein said integrating circuit comprises a capacitor, and each resetting stage comprises a transistor having an emitter coupled to a terminal of said signal integrating capacitor in the integrating circuit. a collector coupled to a power supply terminal through a resistor, and a base coupled to the second switching signal generator for supplying switching pulses with a reference voltage.

7. A television camera as claimed in claim 2, further comprising a plurality of difference amplifiers each having an output coupled to said integrating circuits respectively, a non-inverting input coupled to the reference potential, and an inverting input coupled through a resistor to the amplifier output and to the respective output lead.

8. A television camera as claimed in claim 1, wherein the outputs of the switches are alternatingly coupled in three groups which are coupled to three output leads.

9. A television camera as claimed in claim 1, wherein said first switching signal generator means provides that three switches which are coupled to three adjacent signal electrode strips are closed simultaneously.

10. A television pick-up tube comprising a tube envelope, a target plate disposed within said envelope and having a plurality of signal electrode strips, a plurality of switches having inputs coupled to said strips respectively and outputs, successive outputs being alternatingly coupled in at least two groups to at least two output leads which have at least one electrically conducting wall feed-through through the tube envelope.

11. A television pick-up tube as claimed in claim 10, wherein the two output leads are disposed on either side of the ends of the signal electrode strips.

12. A tube as claimed in claim 10, wherein each output lead has a separate electrically conducting wall feedthrough through the tube envelope.

13. A tube as claimed in claim 10, further comprising an output circuit disposed within said envelope and coupled to said two output leads and to only one conductive wall feedthrough.

* * * * *